United States Patent [19]
Takakusaki

[11] Patent Number: 6,128,329
[45] Date of Patent: Oct. 3, 2000

[54] SPREAD-SPECTRUM RECEIVER

[75] Inventor: Keiji Takakusaki, Yokohama, Japan

[73] Assignee: Matsushita Electric Industrial Co., Ltd., Osaka, Japan

[21] Appl. No.: 08/990,770

[22] Filed: Dec. 15, 1997

[30] Foreign Application Priority Data

Dec. 25, 1996 [JP] Japan .................................... 8-355836

[51] Int. Cl.$^7$ ................................................ H04L 27/30
[52] U.S. Cl. .......................... 375/140; 375/130; 375/143; 375/152; 375/148
[58] Field of Search ................................. 375/347, 267, 375/140, 130, 143, 152, 148; 370/320, 335

[56] References Cited

U.S. PATENT DOCUMENTS

| | | | |
|---|---|---|---|
| 5,663,990 | 9/1997 | Bolgiano et al. | 375/347 |
| 5,764,687 | 6/1998 | Easton | 375/206 |
| 5,859,874 | 1/1999 | Wiedeman et al. | 375/267 |
| 5,943,362 | 8/1999 | Saito | 375/200 |

FOREIGN PATENT DOCUMENTS 8186521 7/1996 Japan .

OTHER PUBLICATIONS

Tateesh S., et al., "Channel Adapted RAKE Receiver (CAR-AKE) for Coherent Uplink Demodulation", IEEE Second Symposium on Communications and Vehicular Technology in the Benelux, Nov. 23, 1994, pp. 155–158.

Office Action dated Feb. 29, 2000 in a corresponding foreign application.

*Primary Examiner*—Stephen Chin
*Assistant Examiner*—Shu Wang Liu
*Attorney, Agent, or Firm*—Stevens, Davis, Miller & Moshner, L.L.P.

[57] ABSTRACT

A high frequency signal received by an antenna is converted into a base-band signal through frequency conversion and quadrature detection in a radio circuit. Through search processing of the base-band signal in a timing control circuit, timings for a plurality of paths are detected, whereby first and second replica code timing indicating signals, a timing pulse, and first and second delay time indicating signals are generated. In first and second replica code generators, first and second replica codes are generated at timings indicated by the first and second replica code timing indicating signals, respectively. In first and second correlators, a correlation value of the base-band signal and the first replica code and a correlation value of the base-band signal and the second replica code are determined, respectively. In first and second synchronous detectors, output signals of the first and second correlators undergo synchronous detections, respectively, whereby first and second symbols are outputted. In first and second timing adjusting buffers, the first and second symbol signals are latched in response to the timing pulses, respectively, and the first and second symbol signals as latched are outputted with delay times indicated by the first and second delay time indicating signals, respectively. Output signals from the first and second timing adjusting buffers are combined together by a RAKE combining circuit.

5 Claims, 7 Drawing Sheets

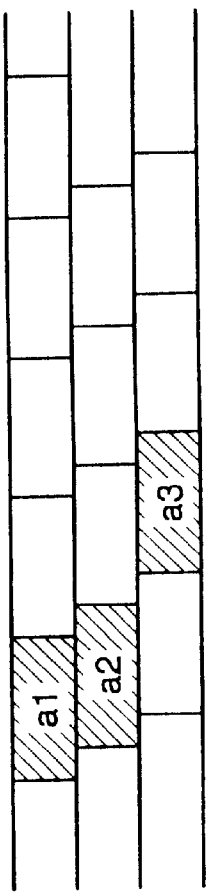
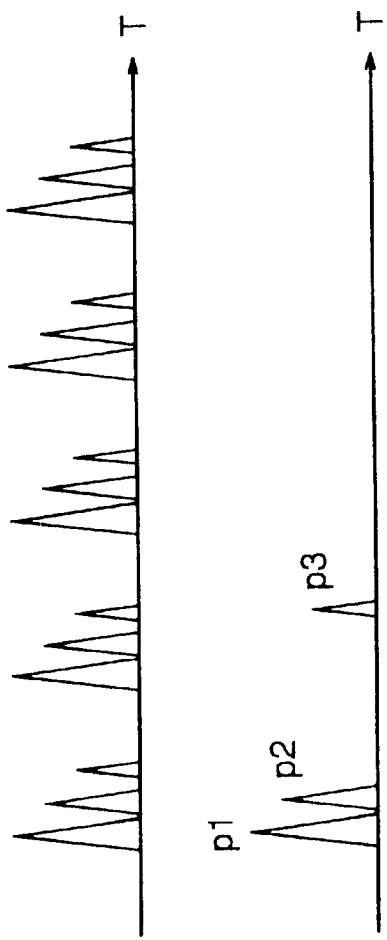
FIG. 4A
FIG. 4B
FIG. 4C

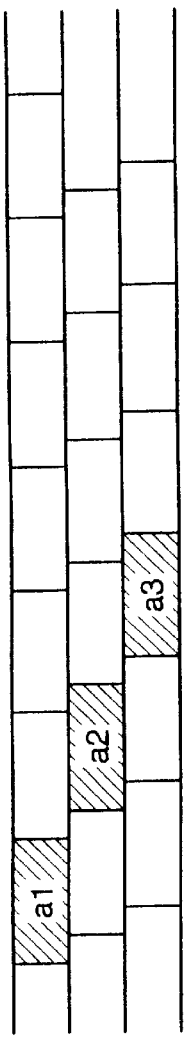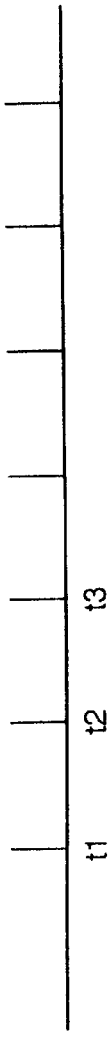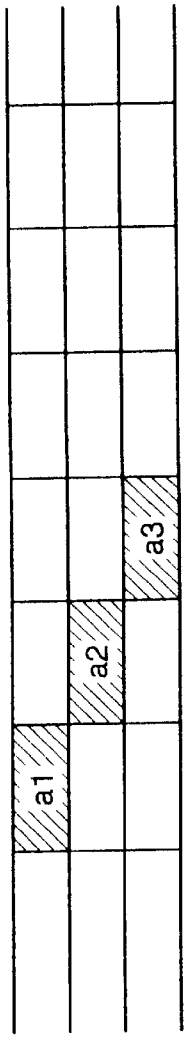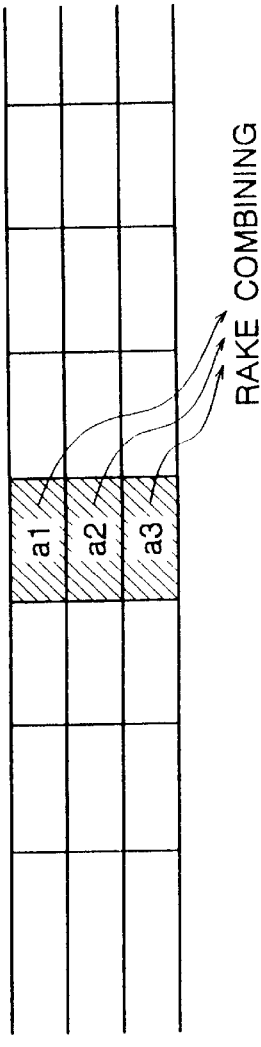
FIG. 7A  OUTPUT OF FIRST FINGER
         OUTPUT OF SECOND FINGER
         OUTPUT OF THIRD FINGER
FIG. 7B  SYMBOL TIMING PULSE
FIG. 7C  OUTPUT FROM FIRST STAGES OF FIRST, SECOND AND THIRD SHIFT REGISTERS $37_1, 37_2, 37_3$
FIG. 7D  INPUT OF RAKE COMBINING CIRCUIT 38

SPREAD-SPECTRUM RECEIVER

BACKGROUND OF THE INVENTION

1. Field of the Invention

The present invention relates generally to a spread-spectrum receiver for a communication system of code-division multiple access scheme (hereinafter also referred to as the CDMA scheme or CDMA communication system) which is used in mobile communication systems such as, e.g. for mobile digital-cellular phone applications. More particularly, the present invention is concerned with a spread-spectrum receiver which is so arranged as to control delay times of timing adjusting buffers by making use of timing signals corresponding to differences in timings among paths for thereby making it possible to take in a RAKE combining the signal on the path(s) delayed one symbol period or more as well.

2. Description of Related Art

According to the CDMA scheme adopted in the mobile communications such as for mobile digital-cellular phone communication and the like, a same frequency band can be used by a plurality of channels at a same time. To this end, at the sender side, transmission symbol data are multiplied by spreading codes which differ from one to another channel to thereby generate a transmission signal to be sent out. In this conjunction, the processing for multiplying the transmission symbol data by the spreading codes, as mentioned above, is referred to as "spreading processing", while the transmission signal (i.e., the signal for transmission) as generated is referred to as "spread spectrum signal". As the spreading codes, there are employed a series of codes generated at high rate on the order of ten and several times to several hundred times as high as the rate of the transmission symbol data. Parenthetically, a minimum unit or element of the spreading code is referred to as a "chip".

The spread-spectrum receiver for the CDMA communication system is adapted to receive the transmission signal sent from a base station. In the spread-spectrum receiver, the received signal is multiplied with a replica code (also referred to as "despreading code" and actually the same as the spreading code used at the sender side) allocated to the receiver at a synchronized timing, whereon the signal resulting from the multiplication is integrated on a symbol-by-symbol basis. This processing is referred to as "correlation processing" or "despreading processing", while the integration value as obtained is referred to as "correlation value". Incidentally, the circuit for performing the correlation processing is called a "correlator". In the correlation processing, when the replica code used at the receiver is same as the spreading code employed at the sender, a large correlation value can be obtained. In that case, the correlation value as obtained bears equality to the transmission symbol data. On the contrary, when the replica code used at the receiver differs from the spreading code used at the sender, it is impossible to derive the correlation value. Accordingly, upon reception of multiple transmission signals resulting from simple addition of the transmitting signals of a plurality of channels, it is possible to derive only the transmission symbol data of the channel of concern by performing the correlation processing on the multiple received signal and the spreading code allocated to the channel of concern. This is the principle underlying the demodulation of the spread spectrum signals separately for the individual channels, respectively, in the CDMA communication system.

In order to demodulate the spread spectrum signal, the timing of the spreading code contained in the received signal has to coincide with the timing of the replica code used in the receiver. Deviation of the timing of the replica code from that of the spreading code even by only one chip incurs the same result as that of the multiplication of the received signal by utterly irrelevant replica code, making it impossible to obtain a large correlation value. For this reason, in the CDMA communication system, timing synchronization of extremely high accuracy is required between the spreading code and the replica code.

One of the major causes for the deterioration or lowering of the frequency utilization efficiency in the CDMA communication system is interference by other users' apparatuses. When the transmission power is lowered at all the users' apparatuses, mutual interference can certainly be mitigated or suppressed. However, the communication quality at the individual users' apparatuses will become degraded. Under these circumstances, there arises a demand for technology which can ensure high communication quality even at a low reception power level. Although there have been proposed and developed numerous techniques for ensuring the high communication quality, they can not exhibit the intrinsic capabilities unless the synchronization of the spreading code with the replica code is established. Thus, it is safe to say that the synchronization state of the spreading code governs the performance of the CDMA communication.

At this juncture, it should be mentioned that overland mobile communication involves multiple propagation paths with different delays due to reflections and diffractions of radio waves at buildings, mountains and the like. In the conventional narrow-band communication system known heretofore, the radio wave of the temporally preceding symbol exerts interference to the temporally succeeding symbol radio wave (known as the inter-symbol interference), bringing about remarkable degradation in the characteristics. For suppressing or preventing such inter-symbol interference, it is required to use an adaptive equalizer and the like, which however involves much complicated and expensive system configuration, to a great disadvantage.

By contrast, in the case of the spread-spectrum communication system, the timing of the replica code can match with the signal of only one of the multiple paths, if any, while the timing of the replica code is out of match with the signals on the other paths. Thus, only the signal on the one path of concern makes appearance in the signal obtained after the demodulation, avoiding essentially any influence from the signals on the other paths. As is apparent from the foregoing, the spread-spectrum communication system can ensure high temporal resolution power, making it unnecessary to provide the adaptive equalizer, because of very low probability of occurrence of inter-symbol interference notwithstanding the presence of multiple paths.

For demodulating the received signals from the multiple paths, it is required first to measure or determine the timing of the signal from each of the multiple paths independently. This measurement can be realized by performing the correlation processing for the received signal and the replica code while shifting the timing of the replica code. By plotting then the correlation values with the timing of the replica codes being taken along the abscissa while the correlation values at the individual timings are taken along the ordinate, a graph referred to as a "delay profile" can be obtained (see FIGS. 4B and 4C). At this juncture, it should be mentioned that the values T taken along the abscissa does not indicate the real time but indicate "shift of the replica code".

In the delay profile, the signals on the individual paths are represented by independent or discrete pulse waveforms, respectively. Thus, the delay profile substantially corresponds to the impulse responses of the propagation paths. For these reasons, a plurality of replica code generators and a corresponding number of correlators are employed, wherein an arrangement is made such that the timings of the individual replica codes can be set independent of one another. The timings of plural replica codes are then caused to match with the timings on the corresponding number of the paths, respectively, as read out from the delay profile. In this manner, the signals on the individual paths can be demodulated independent of one another in the state bringing about no mutual interference. Since these plural demodulated signals carry the same information, there can be realized enhanced reception quality by synthesizing the demodulated signals. This is known as the path diversity effect. The procedure mentioned above is called the "RAKE scheme" because of resemblance to the function of a rake in that the signals are collected together from the individual paths. The RAKE scheme or function intrinsically owes to the spread-spectrum communication system, taking advantage of obstacles encountered in the multiple propagation environment, and thus the RAKE scheme is indispensable for ensuring high quality for the communication in the spread-spectrum communication system.

In this conjunction, a set of the replica code generator, the correlator and the synchronous detector employed for demodulating the signal on one path is referred to as a "finger" by likening to the finger of the rake. Accordingly, for realizing the demodulation and RAKE combination of the signals on n paths, there are required n fingers, i.e., n sets each composed of the replica code generator, the correlator and the synchronous detector. Parenthetically, the matching of the timing of the replica code to the timing of the signal on a given path is referred to as "finger allocation".

In order to make the most of the advantageous feature of the RAKE scheme, it is necessary to determine the timing of the signal on each path as well as the reception level thereof for thereby realizing the synchronization reliably without fail by allocating the timings of the signal on the individual paths to the fingers sequentially in the order of high to low reception levels. This sequence is referred to as "search". By performing the search processing, synchronization can be established in the spread-spectrum receiver of the CDMA communication system.

For having better understanding of the underlying concept of the invention, the technical background thereof will reviewed in some detail. FIG. 1 of the accompanying drawings is a block diagram showing generally a structure of a conventional spread-spectrum receiver according to a three-finger RAKE scheme. Referring to the figure, a high frequency signal received by an antenna 1 undergoes frequency conversion and quadrature detection in a radio circuit 2 to be converted into a base-band signal, which is then inputted to a timing control circuit 3 for determining timings for first to third paths, respectively, through the synchronous search processing. The first timing signal corresponding to the first path is inputted to a first replica code generator $4_1$ and a first correlator $5_1$, the second timing signal corresponding to the second path is inputted to a second replica code generator $4_2$ and a second correlator $5_2$, and the third timing signal corresponding to the third path is inputted to a third replica code generator $4_3$ and a third correlator $5_3$. In the first to third replica code generators $4_1$ to $4_3$, codes, each of which is the same as the spreading code used in the spreading process performed at the sender side, are generated as first to third replica codes (also referred to as the reverse-spreading codes), respectively. The first to third replica codes are supplied to the first to third correlators $5_1$ to $5_3$ from the first to third replica code generators $4_1$ to $4_3$, respectively, at the timings given by the first to third timing signals, respectively. In the first correlator $5_1$ the base-band signal inputted from the radio circuit 2 is multiplied by the first replica code, whereupon the product signal resulted from the multiplication is integrated to obtain a first correlation value on a symbol-by-symbol basis. The first correlation value undergoes synchronous detection in a first synchronous detector $6_1$ to be thereby converted into a first symbol signal. The first symbol signal is then latched by a first latch circuit $7_1$ serving as a timing adjusting buffer in response to a symbol timing pulse supplied from the timing control circuit 3. In the second correlator $5_2$, the base-band signal is multiplied by the second replica code, whereupon the product signal resulted from the multiplication is integrated to obtain a second correlation value on a symbol-by-symbol basis. The second correlation value undergoes synchronous detection in a second synchronous detector $6_2$ to be thereby converted into a second symbol signal. The second symbol signal is latched by a second latch circuit $7_2$ serving as a timing adjusting buffer in response to the symbol timing pulse. In the third correlator $5_3$, the base-band signal is multiplied by the third replica code, whereupon the product signal resulted from the multiplication is integrated to obtain a third correlation value on a symbol-by-symbol basis. The third correlation value undergoes synchronous detection in a third synchronous detector $6_3$ to be thereby converted into a third symbol signal. The third symbol signal is latched by a third latch circuit $7_3$ serving as a timing adjusting buffer in response to the symbol timing pulse. The output signals of the first to third latch circuits $7_1$ to $7_3$ are synthesized or combined together by a RAKE combining circuit 8 to be outputted therefrom as a demodulated signal.

As can be seen in FIG. 2, symbol signals a1, b1 and c1 are outputted sequentially from the first finger (composed of the first replica code generator $4_1$, the first correlator $5_1$ and the first synchronous detector $6_1$), symbol signals a2, b2 and c2 are outputted sequentially from the second finger (composed of the second replica code generator $4_2$, the second correlator $5_2$ and the second synchronous detector $6_2$) at timings delayed a little relative to the symbol signals a1, b1 and c1, respectively, and symbol signals a3, b3 and c3 are outputted sequentially from the third finger (composed of the third replica code generator $4_3$, the third correlator $5_3$ and the third synchronous detector $6_3$) at timings delayed a little relative to the symbol signals a2, b2 and c2, respectively. Accordingly, by generating sequentially symbol timing pulses ta, tb and tc from the timing control circuit 3 immediately before the boundaries of every one symbol period in the most leading path, to thereby allow the output signals of the first to third fingers to be latched by the first to third latch circuits $7_1$ to $7_3$ in response to the symbol timing pulses ta, tb and tc, respectively, then the symbol signals a1, a2 and a3 are latched by the first to third latch circuits $7_1$ to $7_3$, respectively, at the same timing in response to the symbol timing pulse ta, the symbol signals b1, b2 and b3 are latched by the first to third latch circuits $7_1$ to $7_3$, respectively, at the same timing in response to the symbol timing pulse tb, and the symbol signals c1, c2 and c3 are latched by the first to third latch circuits $7_1$ to $7_3$, respectively, at the same timing in response to the symbol timing pulse tc. Because the corresponding symbol signals are latched by the first to third latch circuits $7_1$ to $7_3$, respectively, in this way, there can be derived the demodulated signals a, b and c by combining or synthesizing the output signals of the first to third latch circuits $7_1$ to $7_3$ by the RAKE combining circuit 8.

The conventional spread-spectrum receiver of the CDMA communication system, however, suffers a shortcoming in that the symbol signal on the path presenting a delay corresponding to one symbol period or more relative to the path leading topmost in the timing cannot be latched at the same time with the signals on the other paths because there is provided only one stage of latch circuit serving as the timing adjusting buffer between the finger and the RAKE combining circuit. To say this in another way, only the signals on the paths presenting the delay less than one symbol period can be synthesized by the RAKE combining circuit, which in turn means that the pulses susceptible to the RAKE combination are limited. Consequently, the reception level of the spread-spectrum receiver can not effectively be increased even when the number of the fingers is increased, providing this difficulty in improving the communication quality of the CDMA communication system.

SUMMARY OF THE INVENTION

In the light of the state of the art described above, it is an object of the present invention to provide a spread-spectrum receiver which is capable of performing RAKE combination even for the signal on the path presenting a delay corresponding to one symbol period or more relative to the path of the most leading timing, to thereby ensure improved communication quality while suppressing interference to possible minimum for allowing the CDMA communication system to accommodate an increased number of users' apparatuses.

In view of the above and other objects which will become apparent as the description proceeds, there is provided according to a general aspect of the present invention a spread-spectrum receiver which includes:

a radio circuit for converting a high frequency signal received by an antenna into a base-band signal through frequency conversion and quadrature detection, a timing control circuit for detecting timings on a plurality of paths through search processing of said base-band signal to thereby generate first and second replica code timing indicating signals, a timing pulse and first and second delay time indicating signals, a first replica code generator for generating a first replica code at a timing indicated by the first replica code timing indicating signal supplied from the timing control circuit, a second replica code generator for generating a second replica code at a timing indicated by the second replica code timing indicating signal supplied from the timing control circuit, a first correlator for determining a correlation value of the base-band signal and the first replica code supplied from the first replica code generator, a second correlator for determining a correlation value of the base-band signal and the second replica code supplied from the second replica code generator, a first synchronous detector for outputting a first symbol signal through synchronous detection of an output signal of the first correlator, a second synchronous detector for outputting a second symbol signal through synchronous detection of an output signal of the second correlator, a first timing adjusting buffer for latching the first symbol signal outputted from the first synchronous detector in response to the timing pulse supplied from the timing control circuit and outputting the first symbol signal as latched with a delay time indicated by the first delay time indicating signal outputted from the timing control circuit, a second timing adjusting buffer for latching the second symbol signal outputted from the second synchronous detector in response to the timing pulse supplied from the timing control circuit and outputting the second symbol signal as latched with a delay time indicated by the second delay time indicating signal outputted from the timing control circuit, and a RAKE combining circuit for synthesizing output signals from the first timing adjusting buffer and the second timing adjusting buffer.

In a preferred mode for carrying out the present invention, the first and second delay time indicating signals may be so prepared as to indicate delay times for the first and second timing adjusting buffers, respectively, either on a chip period basis or on a symbol period basis.

In another preferred mode for carrying out the present invention, the first timing adjusting buffer may include plural stages of first latch circuits disposed between the first synchronous detector and the RAKE combining circuit, and a plurality of first switches disposed between output terminals of the plural stages of first latch circuits and the RAKE combining circuit, respectively, and turned on/off under the control of the first delay time indicating signal. Similarly, the second timing adjusting buffer may include plural stages of second latch circuits disposed between the second synchronous detector and the RAKE combining circuit, and a plurality of second switches disposed between output terminals of the plural stages of second latch circuits and the RAKE combining circuit, respectively, and turned on/off under the control of the second delay time indicating signal.

In a further preferred mode for carrying out the present invention, the aforementioned timing control circuit may be so arranged as to generate the first and second delay time indicating signals on the basis of a delay profile obtained by using a long code longer than one symbol period.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 4A to 4C are graphs for illustrating a method of obtaining a delay profile for plural paths;

FIGS. 7A to 7D are views for illustrating a RAKE combination in the spread-spectrum receiver shown in FIG. 6.

DESCRIPTION OF THE PREFERRED EMBODIMENTS

Now, the invention will be described in detail in conjunction with what is presently considered as preferred or typical embodiments thereof by reference to the drawings.

Embodiment 1

The spread-spectrum receiver according to the first embodiment of the present invention is so arranged that the delays of symbol signals outputted from a plurality of fingers are adjusted by making use of shift registers capable of adjusting the delay time on a chip period basis for thereby matching the timings of the symbol signals which are then synthesized or combined together by a RAKE combining circuit.

Figure 1:
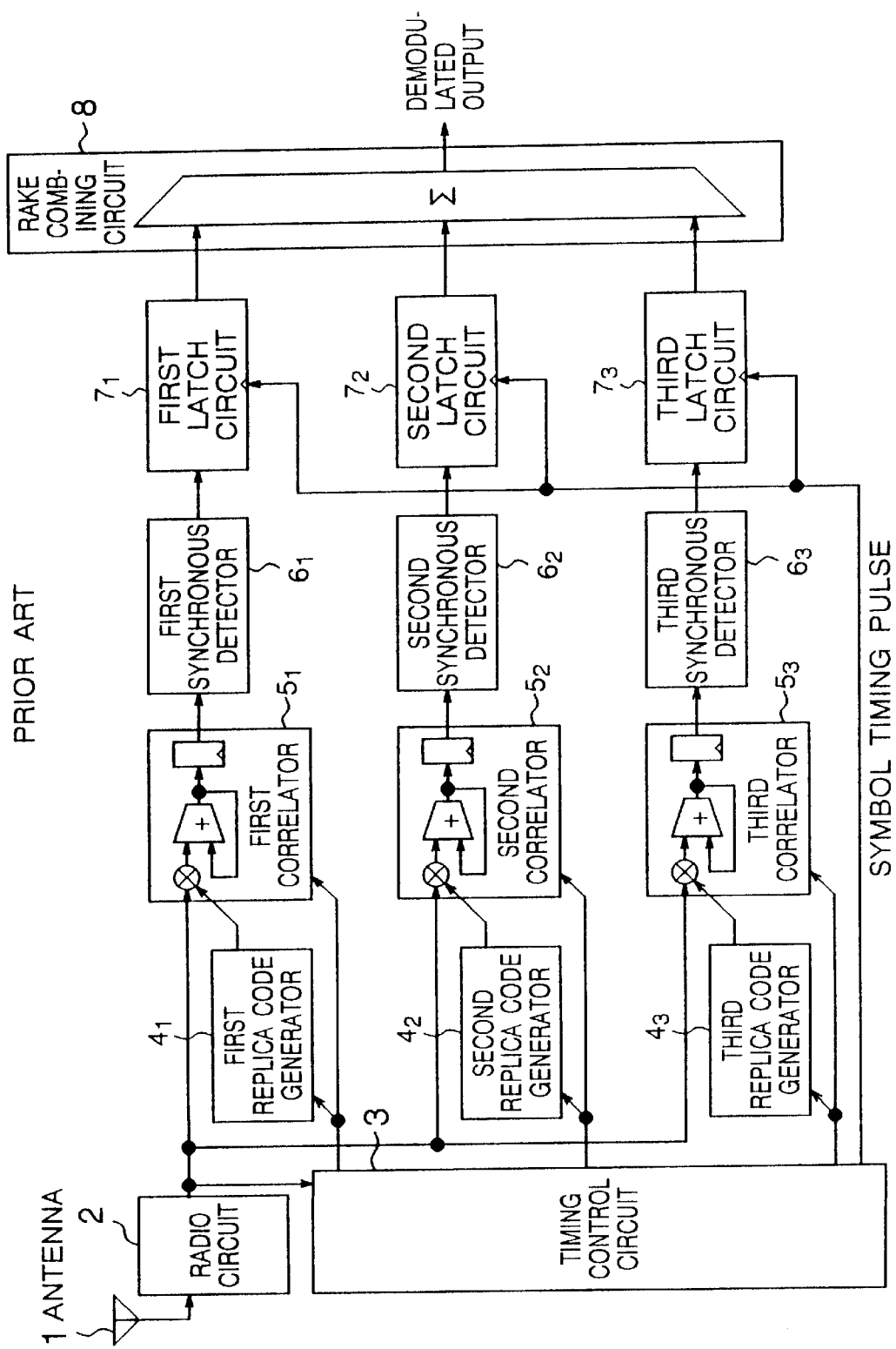
FIG. 1 is a block diagram showing generally a structure of a conventional spread-spectrum receiver.
Figure 2:
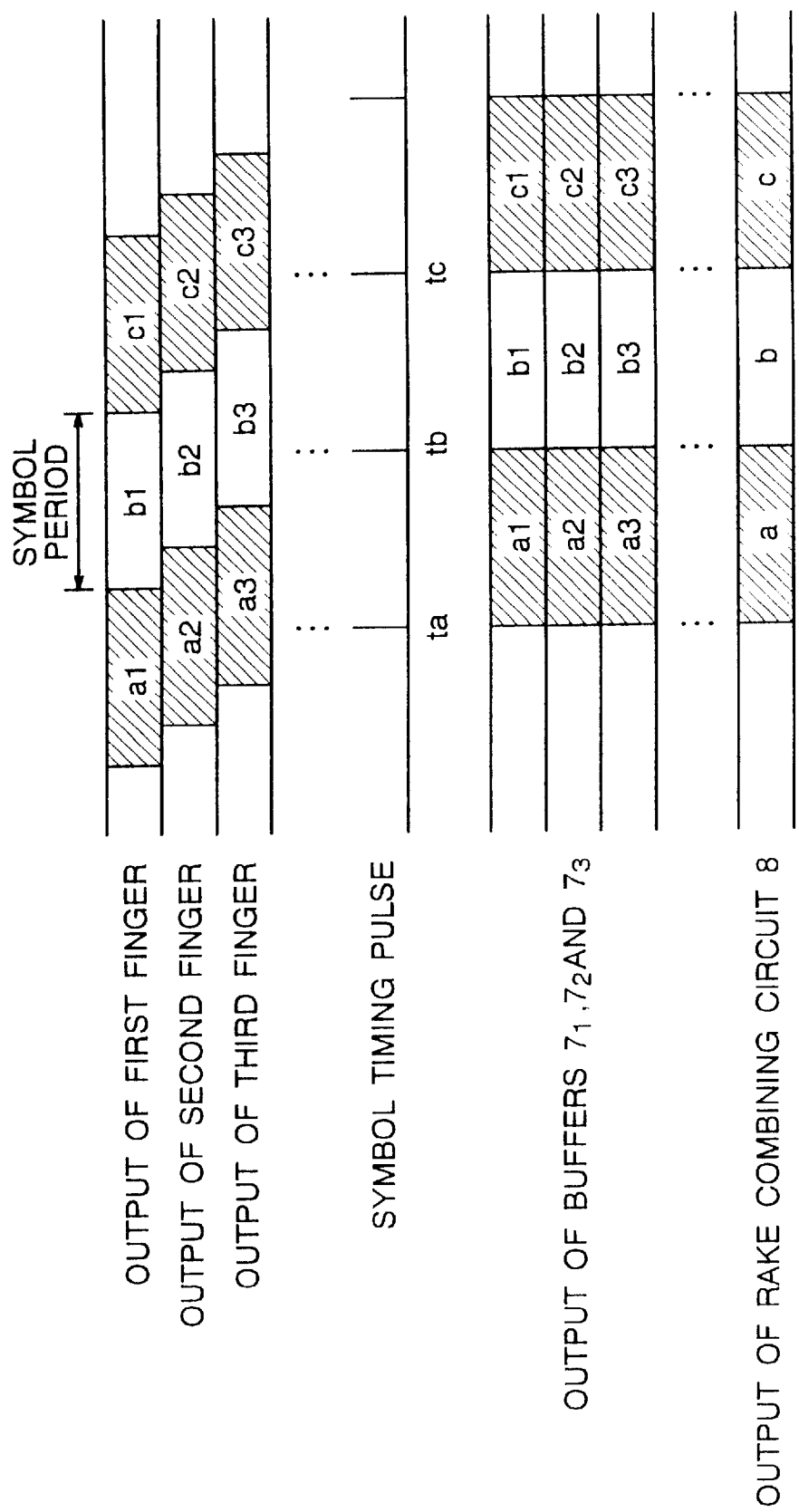
FIG. 2 is a view for illustrating a method of matching the timings of symbol signals in the conventional spread-spectrum receiver.
Figure 3:
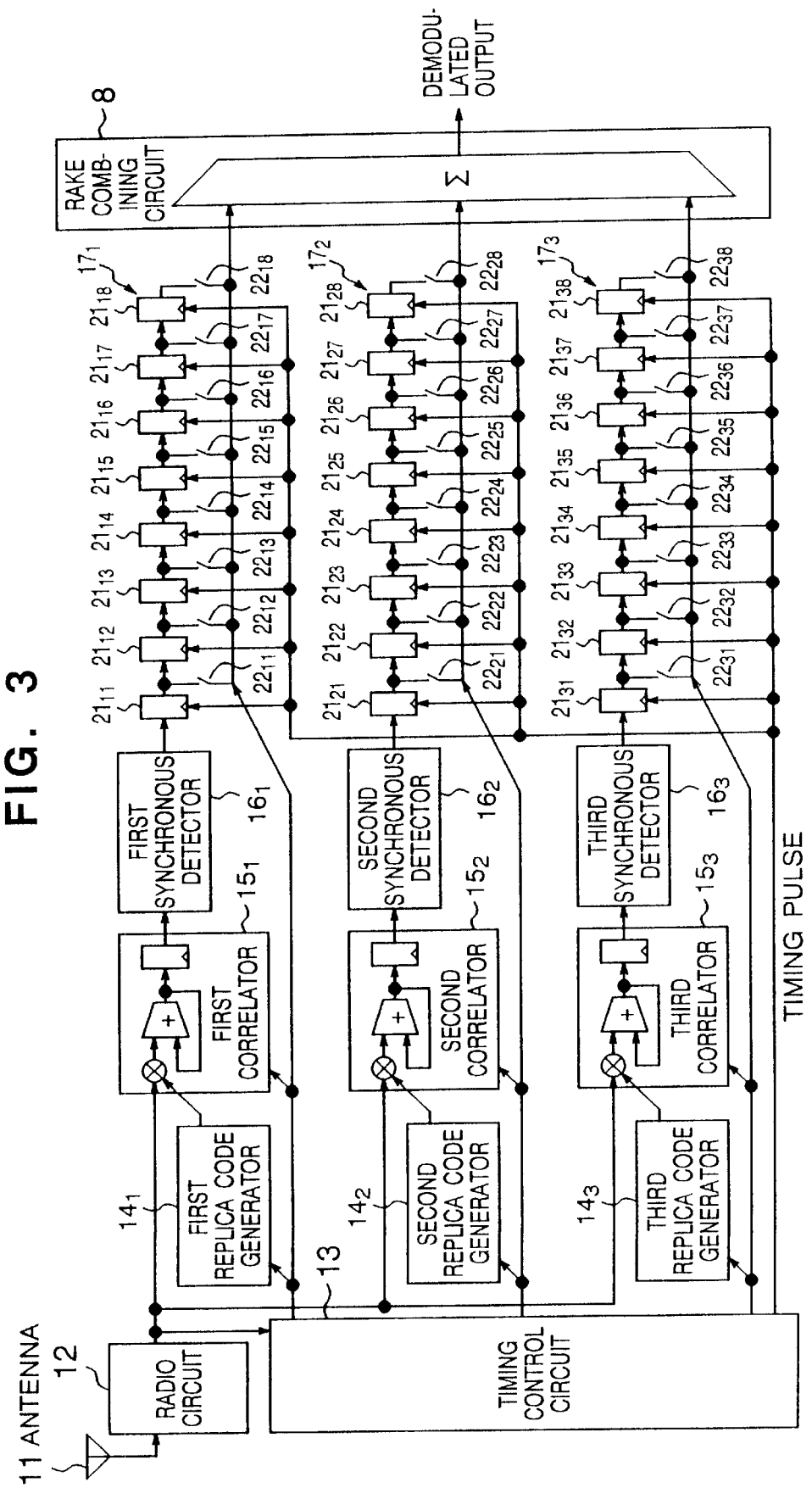
FIG. 3 is a block diagram showing a structure of a spread-spectrum receiver according to a first embodiment of the present invention.
Figure 5:
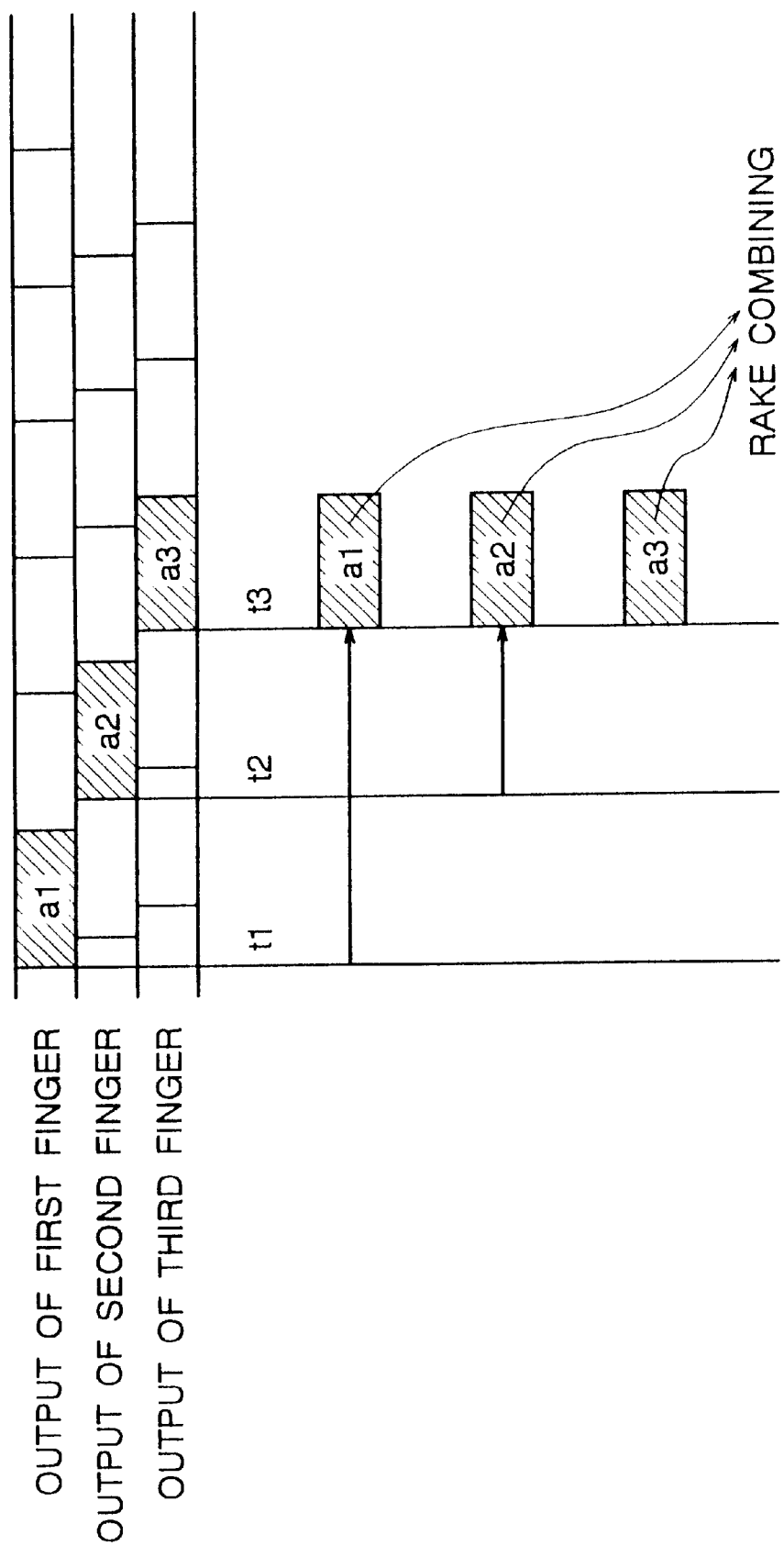
FIG. 5 is a view illustrating a method of a RAKE combination in the spread-spectrum receiver shown in FIG. 3.

More specifically, referring to FIG. 3, the spread-spectrum receiver according to the first embodiment includes a first shift register $17_1$ which is disposed between a first synchronous detector $16_1$ and a RAKE combining circuit 18 to serve as a timing adjusting buffer in place of the first latch circuit $7_1$ mentioned previously and which is so designed as to be capable of adjusting the delay time on a chip period basis, a second shift register $17_2$ which is disposed between a second synchronous detector $16_2$ and the RAKE combining circuit 18 to serve as the timing adjusting buffer in place of the second latch circuit $7_2$ mentioned previously and which is so designed as to be capable of adjusting the delay time on a chip period basis, and a third shift register $17_3$ which is disposed between a third synchronous detector $16_3$ and the RAKE combining circuit 18 to serve as the timing adjusting buffer in place of the third latch circuit $7_3$ mentioned previously and which is so designed as to be capable of adjusting the delay time on a chip period basis. Thus, the spread-spectrum receiver according to the first embodiment differs from the conventional spread-spectrum receiver shown in FIG. 1 in that the shift registers are employed in place of the latch circuits. Now, description will be directed to the structure of the shift register. The first shift register $17_1$ is composed of eight stages of first latch circuits $21_{11}$ to $21_{18}$ provided to latch sequentially an output signal of the first synchronous detector $16_1$ in response to timing pulses outputted from the timing control circuit 13, and eight stages of first switches $22_{11}$ to $22_{18}$ disposed between the output terminals of the first latch circuits $21_{11}$ to $21_{18}$ and the RAKE combining circuit 18, respectively and controlled to be turned on/off in response to a first timing signal outputted from the timing control circuit 13. The second shift register $17_2$ is composed of eight stages of second latch circuits $21_{21}$ to $21_{28}$ arranged to latch sequentially an output signal of a second synchronous detector $16_2$ in response to the timing pulses outputted from the timing control circuit 13, and eight stages of second switches $22_{21}$ to $22_{28}$ disposed between the output terminals of the second latch circuits $21_{21}$ to $21_{28}$ and the RAKE combining circuit 18, respectively and controlled to be turned on/off in response to a second timing signal outputted from the timing control circuit 13. The third shift register $17_3$ is composed of eight stages of third latch circuits $21_{31}$ to $21_{38}$ arranged to latch sequentially an output signal of a third synchronous detector $16_3$ in response to the timing pulses outputted from the timing control circuit 13, and eight stages of third switches $22_{31}$ to $22_{38}$ disposed between the output terminals of the third latch circuits $21_{31}$ to $21_{38}$ and the RAKE combining circuit 18, respectively and controlled to be turned on/off in response to a third timing signal outputted from the timing control circuit 13.

In the spread-spectrum receiver according to the first embodiment, the radio wave sent out from the base station is received by an antenna 11. A high frequency signal received by the antenna 11 undergoes frequency conversion and detection in a radio circuit 12 to be converted into a base-band signal, which is then inputted to the timing control circuit 13 for determining timings for first to third paths, respectively, through the search processing mentioned hereinbefore. The first timing signal corresponding to the first path is inputted to a first replica code generator $14_1$, a first correlator $15_1$ and the first shift register $17_1$. The second timing signal corresponding to the second path is inputted to a second replica code generator $14_2$, a second correlator $15_2$ and the second shift register $17_2$. The third timing signal corresponding to the third path is inputted to a third replica code generator $14_3$, a third correlator $15_3$ and the third shift register $17_3$. In the first to third replica code generators $14_1$ to $14_3$, codes, each of which is the same as the spreading code used in the spreading process performed at the sender side, are generated as the first to third replica codes (despreading codes), respectively. The first to third replica codes are supplied to the first to third correlators $15_1$ to $15_3$ at the timings given by the first to third timing signals, respectively. In the first correlator $15_1$, the base-band signal inputted from the radio circuit 12 is multiplied by the first replica code, whereupon the product signal resulted from the multiplication is integrated to obtain a first correlation value on a symbol-by-symbol basis. The first correlation value undergoes synchronous detection in the first synchronous detector $16_1$ to be thereby converted into a first symbol signal. The first symbol signal is then latched sequentially by the eight stages of first latch circuits $21_{11}$ to $21_{18}$ of the first shift register $17_1$ in response to the timing pulses supplied from the timing control circuit 13. In the second correlator $15_2$, the base-band signal is multiplied by the second replica code, whereupon the product signal resulting from the multiplication is integrated to obtain a second correlation value on a symbol-by-symbol basis. The second correlation value undergoes synchronous detection in the second synchronous detector $16_2$ to be thereby converted into a second symbol signal. The second symbol signal is latched sequentially by the eight stages of second latch circuits $21_{21}$ to $21_{28}$ of the second shift register $17_2$ in response to the timing pulses. In the third correlator $15_3$, the base-band signal is multiplied by the third replica code, whereupon the product signal resulting from the multiplication is integrated to obtain a third correlation value on a symbol-by-symbol basis. The third correlation value undergoes synchronous detection in the third synchronous detector $16_3$ to be thereby converted into a third symbol signal. The third symbol signal is latched sequentially by the eight stages of third latch circuits $21_{31}$ to $21_{38}$ of the third shift register $17_3$ in response to the timing pulse. The output signals of the first to third shift registers $17_1$ to $17_3$ are synthesized or combined together by the RAKE combining circuit 18 in accordance with e.g. a maximum rate synthesizing method to be subsequently outputted therefrom as a demodulated signal.

Now, the operation of the timing control circuit 13 will be described in detail by reference to FIGS. 4A to 4C and FIG. 5.

It is assumed that the symbol signals corresponding to the first to third paths (i.e., first to third symbol signals a1 to a3 outputted from the first to third fingers) bear mutually such timing relations as illustrated in FIG. 4A. In that case, when the correlation is determined by using a short code having the period corresponding to one symbol period, there will obtained a delay profile exhibiting a same pattern at every symbol period, as can be seen in FIG. 4B. It is impossible to determine from such delay profile the timing for the path presenting a longer delay than the one-symbol period. On the other hand, when the correlation is determined by using a long code having the period much longer than the one-symbol period, there can be obtained a delay profile which corresponds to the delay times of the paths, as can be seen in FIG. 4C. Thus, it is possible to determine in terms of the number of chips the magnitudes of the delays on the second and third paths relative to the leading first path on the basis of the peak values p1 to p3 of the delay profile obtained by using the long code.

Again assuming that the symbol signals a1 to a3 of the first to third fingers make appearance at the timings t1 to t3, respectively, the first and second symbol signals a1 and a2 lead the most delayed symbol signal a3 of the third finger by "t3−t1" and "t3−t2", respectively. Accordingly, by delaying the first symbol signal a1 of the first finger by "t3−t1" and delaying the symbol signals a2 of the second finger by "t3−t2", the timings of the symbol signals a1 to a3 of the first to third fingers can be matched with one another.

More specifically, the first timing signal (i.e., first delay time indicating signal) indicating a delay time on a chip basis is outputted from the timing control circuit 13 to the first shift register $17_1$, whereby only the first one of the eight stages of first switches $22_{11}$ to $22_{18}$ that corresponds to the delay time indicated by the first timing signal is closed. Further, the second timing signal (i.e., second delay time indicating signal) indicating a delay time on a chip basis is outputted from the timing control circuit 13 to the second shift register $17_2$, whereby only the second one of the eight stages of second switches $22_{21}$ to $22_{28}$ that corresponds to the delay time indicated by the second timing signal is closed. Furthermore, the third timing signal (i.e., third delay time indicating signal) indicating a delay time on a chip basis is outputted to the third shift register $17_3$ from the timing control circuit 13, whereby only the third one of the eight stages of third switches $22_{31}$ to $22_{38}$ that corresponds to the delay time indicated by the third timing signal is closed. By way of example, let's suppose that the symbol signals a1 and a2 of the first and second fingers lead the third symbol signal a3 of the third finger by six chips and three chips, respectively. In that case, in the first shift register $17_1$, only the first switch $22_{17}$ of the seventh stage corresponding to the first timing signal indicating the delay time of six chips is closed, while in the second shift register $17_2$, only the second switch $22_{24}$ of the fourth stage corresponding to the second timing signal indicating the delay time of three chips is closed. On the other hand, in the third shift register $17_3$, only the third switch $22_{31}$ of the first stage corresponding to the third timing signal indicating no delay is closed.

With the arrangement described above, the symbol signals are outputted at the same timing from the first to third shift registers $17_1$ to $17_3$. Thus, by synthesizing or combining together these symbol signals by the RAKE combining circuit 18, there can be obtained the demodulated signal having the reception level enhanced effectively regardless of whether the delay time on the path is shorter than or longer than the one-symbol period.

Parenthetically, each of the first to third shift registers $17_1$ to $17_3$ is implemented in eight stages in the spread-spectrum receiver illustrated in FIG. 3. It should, however, be appreciated that each of the first to third shift registers $17_1$ to $17_3$ is realized with the number of stages which correspond to the delay time on the path in practical applications.

Embodiment 2

A spread-spectrum receiver according to a second embodiment of the present invention is so arranged that the amounts of delay of the symbol signals outputted from a plurality of fingers are adjusted by making use of shift registers capable of adjusting the delay time on a symbol period basis for thereby matching the timings of the symbol signals, which signals are then synthesized or combined together according to the RAKE sheme.

Figure 6:
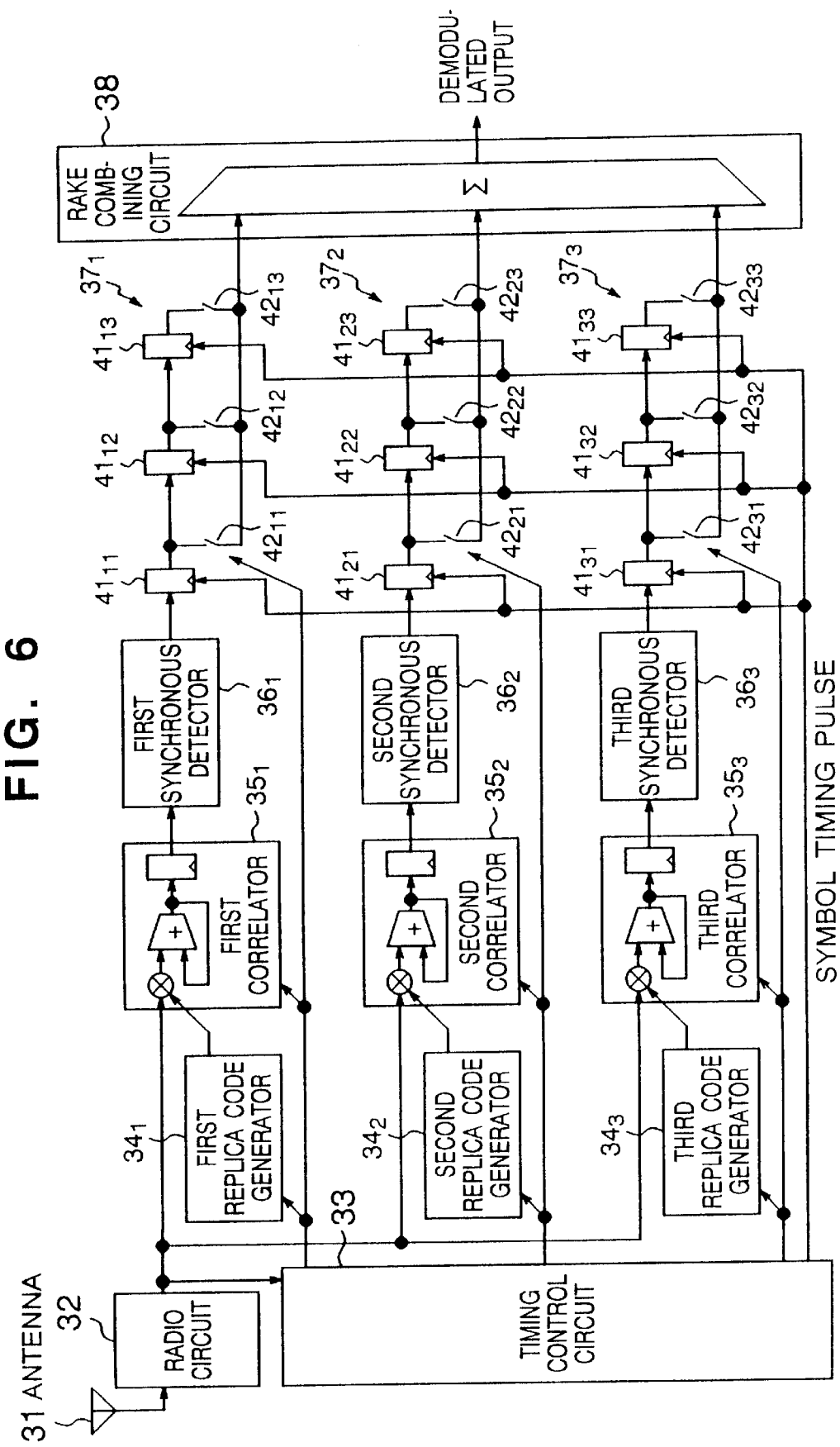
FIG. 6 is a block diagram showing a structure of a spread-spectrum receiver according to a second embodiment of the present invention.

More specifically, referring to FIG. 6, the spread-spectrum receiver according to the instant embodiment includes a first shift register $37_1$ which is disposed between a first synchronous detector $36_1$ and a RAKE combining circuit 38 in place of the above-mentioned first shift register $17_1$ capable of adjusting the delay time on a chip period basis and which is so designed as to be capable of adjusting the delay time on a symbol period basis, a second shift register $37_2$ which is disposed between a second synchronous detector $36_2$ and the RAKE combining circuit 38 in place of the above-mentioned second shift register $17_2$ capable of adjusting the delay time on a chip period basis and which is so designed as to be capable of adjusting the delay time on a symbol period basis, and a third shift register $37_3$ which is disposed between a third synchronous detector $36_3$ and the RAKE combining circuit 38 in place of the above-mentioned third shift register $17_3$ capable of adjusting the delay time on a chip period basis and which is so designed as to be capable of adjusting the delay time on a symbol period basis. Thus, the spread-spectrum receiver according to the second embodiment differs from the spread-spectrum receiver according to the first embodiment shown in FIG. 3 in that the shift registers capable of adjusting the delay times on a symbol period basis are employed in place of the shift registers capable of adjusting the delays on a chip period basis. More specifically, the first shift register $37_1$ is comprised of three stages of first latch circuits $41_{11}$ to $41_{13}$ provided to latch sequentially the output signal of the first synchronous detector $36_1$ in response to the symbol timing pulses outputted from the timing control circuit 33, and three stages of first switches $42_{11}$ to $42_{13}$ disposed between the output terminals of the first latch circuits $41_{11}$ to $41_{13}$ and the RAKE combining circuit 38, respectively, and controlled to be turned on/off in response to the first timing signal outputted from the timing control circuit 33. The second shift register $37_2$ is comprised of three stages of second latch circuits $41_{21}$ to $41_{23}$ provided to latch sequentially the output signal of the second synchronous detector $36_2$ in response to the symbol timing pulses outputted from the timing control circuit 33, and three stages of second switches $42_{21}$ to $42_{23}$ disposed between the output terminals of the second latch circuits $41_{21}$ to $41_{23}$ and the RAKE combining circuit 38, respectively and controlled to be turned on/off in response to the second timing signal outputted from the timing control circuit 33. The third shift register $37_3$ is comprised of three stages of third latch circuits $41_{31}$ to $41_{33}$ provided to latch sequentially the output signal of the third synchronous detector $36_3$ in response to the symbol timing pulses outputted from the timing control circuit 33, and three stages of third switches $42_{31}$ to $42_{33}$ disposed between the output terminals of the third latch circuits $41_{31}$ to $41_{33}$ and the RAKE combining circuit 38, respectively and controlled to be turned on/off in response to the third timing signal outputted from the timing control circuit 33.

In the spread-spectrum receiver according to the second embodiment, the antenna 31, the radio circuit 32, the first to third replica code generators $34_1$ to $34_3$, the first to third correlators $35_1$ to $35_3$ and the first to third synchronous detectors $36_1$ to $36_3$ operate similarly to the antenna 11, the radio circuit 12, the first to third replica code generators $14_1$ to $14_3$, the first to third correlators $15_1$ to $15_3$ and the first to third synchronous detectors $16_1$ to $16_3$ in the spread-spectrum receiver according to the first embodiment described hereinbefore.

Now, operations of the timing control circuit 33, the first to third shift registers $37_1$ to $37_3$ and the RAKE combining circuit 38 will be described in detail by reference to FIGS. 7A to 7D.

It is assumed that the symbol signals corresponding to the first to third paths (i.e., first to third symbol signals a1 to a3 outputted from the first to third fingers) bear mutually such timing relations as illustrated in FIG. 7A. In that case, the first symbol signal a1 is latched by the first latch circuit $41_{11}$ constituting the first stage of the first shift register $37_1$ in response to the symbol timing pulse t1 (refer to FIG. 7B) outputted from the timing control circuit 33 immediately before the end of the symbol period of the first symbol signal a1 of the first finger (refer to FIG. 7C). In succession, in response to the symbol timing pulse t2 (refer to FIG. 7B) outputted from the timing control circuit 33 immediately before the end of the succeeding symbol period of the first finger, the first symbol signal a1 latched by the first latch circuit $44_{11}$ constituting the first stage of the first shift register $37_1$ is latched by the first latch circuit $41_{12}$ of the second stage, and at the same time the second symbol signal a2 is latched by the second latch circuit $41_{21}$ of the first stage of the second shift register $37_2$ (refer to FIG. 7C). Subsequently, in response to the symbol timing pulse t3 (refer to FIG. 7B) outputted from the timing control circuit 33 immediately before the end of the succeeding symbol period of the first finger, the first symbol signal a1 latched by the first latch circuit $44_{12}$ constituting the second stage of the first shift register $37_1$ is latched by the first latch circuit $41_{13}$ of the third stage, and at the same time the second symbol signal a2 latched by the second latch circuit $41_{21}$ of the first stage of the second shift register $37_2$ is latched by the second latch circuit $42_{22}$ of the second stage, while the third symbol signal a3 is latched by the third latch circuit $41_{31}$ constituting the first stage of the third shift register $37_3$ (refer to FIG. 7C).

Thus, by closing only the first switch $42_{13}$ disposed at the third stage of the first shift register $37_1$, the second switch $42_{22}$ disposed at the second stage of the second shift register $37_2$ and the third switch $42_{31}$ disposed at the first stage of the third shift register $37_3$ in response to the first to third timing signals (first to third delay time indicating signals), respectively, which are outputted from the timing control circuit 33, it is possible to align the timings of the first to third symbol signals a1 to a3 to be inputted to the RAKE combining circuit 38 (refer to FIG. 7D).

By way of example, suppose that the third symbol signal a3 is delayed by a time period corresponding to 150 chips relative to the first symbol signal a1 while the former is delayed relative to the second symbol signal a2 by a period corresponding to 80 chips. In that case, assuming that the symbol period corresponds to 64 chips, the number of the delay stages may be so determined as to be equal to a quotient resulting from division of the delay chip period by the symbol period. More specifically, the first symbol signal a1 may be delayed relative to the third symbol signal a3 by "2", a quotient of the division of "150" by "64" while the second symbol signal a2 may be delayed relative to the third symbol signal a3 by "1", a quotient of the division of "80" by "64". In this case, by closing only the first switch $42_{13}$ disposed at the third stage of the first shift register $37_1$, the second switch $42_{22}$ disposed at the second stage of the second shift register $37_2$ and the third switch $42_{31}$ disposed at the first stage of the third shift register $37_3$ in response to the first to third timing signals, respectively, which are outputted from the timing control circuit 33, it is possible to align the timings of the first to third symbol signals a1 to a3 to be inputted to the RAKE combining circuit 38. In this way, by using the first to third shift registers $37_1$ to $37_3$ for delaying the symbol signals on a symbol period basis, it is possible to establish the synchronization among the paths with a relatively small number of shift registers even when the delay corresponding to one symbol period or more occurs.

With the arrangement described above, the symbol signals are outputted at the same timing from the first to third shift registers $37_1$ to $37_3$. By synthesizing or combining together these symbol signals by the RAKE combining circuit 38 in accordance with the maximum rate synthesizing method, there can be obtained the demodulated signal having the reception level enhanced efficiently regardless of whether the delay time on the path is shorter than or longer than one symbol period.

Parenthetically, the first to third shift registers $37_1$ to $37_3$ are implemented in three stages in the spread-spectrum receiver illustrated in FIG. 6. It should, however, be appreciated that each of the first to third shift registers $37_1$ to $37_3$ is realized with the number of stages which corresponds to the delay time on the path in practical applications.

As is apparent from the foregoing description, in the spread-spectrum receiver according to the present invention, the RAKE combination can be realized notwithstanding of the path causing the delay corresponding to one symbol or more. In other words, with the spread-spectrum receiver according to the present invention, demodulation processing can be performed for synthesizing or combining the symbol signals for an increased number of paths, which in turn means that the spread-spectrum receiver according to the present invention can enjoy improved anti-interference characteristics. Besides, because of relatively low transmission power and hence little interference to other users' apparatuses, there can be implemented a communication system which can accommodate an increased number of users. Additionally, because the shift register is employed as the timing adjusting buffer for delaying the symbol signals on a symbol period basis, alignment of timings of plural symbol signals can be achieved with a simplified circuit structure.

Many modifications and variations of the resent invention are possible in the light of the above techniques. It is therefore to be understood that within the scope of the appended claims, the invention may be practiced otherwise than as specifically described.

What is claimed is:

1. A spread-spectrum receiver for a code-division multiple access communication system, comprising:
   a radio circuit for converting a high frequency signal received by an antenna into a base-band signal,
   a timing control circuit for detecting timings on a plurality of paths through search processing to thereby generate first and second replica code timing indicating signals, a timing pulse, and first and second delay time indicating signals;
   a first replica code generator for generating a first replica code at a timing indicated by said first replica code timing indicating signal supplied from said timing control circuit;
   a second replica code generator for generating a second replica code at a timing indicated by said second replica code timing indicating signal supplied from said timing control circuit, said second replica code being the same as said first replica code;
   a first correlator for determining a correlation value of said base-band signal and said first replica code supplied from said first replica code generator;

a second correlator for determining a correlation value of said base-band signal and said second replica code supplied from said second replica code generator;

a first synchronous detector for outputting a first symbol signal through synchronous detection of an output signal of said first correlator;

a second synchronous detector for outputting a second symbol signal through synchronous detection of an output signal of said second correlator;

a first timing adjusting buffer for latching said first symbol signal outputted from said first synchronous detector in response to said timing pulse supplied from said timing control circuit, and outputting said first symbol signal as latched with a delay time indicated by said first delay time indicating signal outputted from said timing control circuit;

a second timing adjusting buffer for latching said second symbol signal outputted from said second synchronous detector in response to said timing pulse supplied from said timing control circuit, and outputting said second symbol signal as latched with a delay time indicated by said second delay time indicating signal outputted from said timing control circuit; and a RAKE combining circuit for synthesizing output signals from said first timing adjusting buffer and said second timing adjusting buffer, wherein said first and second delay time indicating signals indicate delay times for said first and second timing adjusting buffers on a chip period basis, respectively, wherein said first timing adjusting buffer includes:
   plural stages of first latch circuits disposed between said first synchronous detector and said RAKE combining circuit; and
   a plurality of first switches disposed between output terminals of said plural stages of first latch circuits and said RAKE combining circuit, respectively, and turned on/off under the control of said first delay time indicating signal, and said second timing adjusting buffer includes:
   plural stages of second latch circuits disposed between said second synchronous detector and said RAKE combining circuit; and
   a plurality of second switches disposed between output terminals of said plural stages of second latch circuits and said RAKE combining circuit, respectively, and turned on/off under the control of said second delay time indicating signal.

2. A spread-spectrum receiver for a code-division multiple access communication system, comprising:

a radio circuit for converting a high frequency signal received by an antenna into a base-band signal;

a timing control circuit for detecting timings on a plurality of paths through search processing to thereby generate first and second replica code timing indicating signals, a timing pulse, and first and second delay time indicating signals;

a first replica code generator for generating a first replica code at a timing indicated by said first replica code timing indicating signal supplied from said timing control circuit;

a second replica code generator for generating a second replica code at a timing indicated by said second replica code timing indicating signal supplied from said timing control circuit, said second replica code being the same as said first replica code;

a first correlator for determining a correlation value of said base-band signal and said first replica code supplied from said first replica code generator;

a second correlator for determining a correlation value of said base-band signal and said second replica code supplied from said second replica code generator;

a first synchronous detector for outputting a first symbol signal through synchronous detection of an output signal of said first correlator;

a second synchronous detector for outputting a second symbol signal through synchronous detection of an output signal of said second correlator;

a first timing adjusting buffer for latching said first symbol signal outputted from said first synchronous detector in response to said timing pulse supplied from said timing control circuit, and outputting said first symbol signal as latched with a delay time indicated by said first delay time indicating signal outputted from said timing control circuit;

a second timing adjusting buffer for latching said second symbol signal outputted from said second synchronous detector in response to said timing pulse supplied from said timing control circuit, and outputting said second symbol signal as latched with a delay time indicated by said second delay time indicating signal outputted from said timing control circuit; and a RAKE combining circuit for synthesizing output signals from said first timing adjusting buffer and said second timing adjusting buffer, wherein said first and second delay time indicating signals indicate delay times for said first and second timing adjusting buffers on a chip period basis, respectively, wherein said timing control circuit generates said first and second delay time indicating signals on the basis of a delay profile obtained by using a long code longer than one symbol period.

3. A spread-spectrum receiver for a code-division multiple access communication system, comprising:

a radio circuit for converting a high frequency signal received by an antenna into a base-band signal;

a timing control circuit for detecting timings on a plurality of paths through search processing to thereby generate first and second replica code timing indicating signals, a timing pulse, and first and second delay time indicating signals;

a first replica code generator for generating a first replica code at a timing indicated by said first replica code timing indicating signal supplied from said timing control circuit;

a second replica code generator for generating a second replica code at a timing indicated by said second replica code timing indicating signal supplied from said timing control circuit, said second replica code being the same as said first replica code;

a first correlator for determining a correlation value of said base-band signal and said first replica code supplied from said first replica code generator;

a second correlator for determining a correlation value of said base-band signal and said second replica code supplied from said second replica code generator;

a first synchronous detector for outputting a first symbol signal through synchronous detection of an output signal of said first correlator;

a second synchronous detector for outputting a second symbol an signal through synchronous detection of an output signal of said second correlator;

a first timing adjusting buffer for latching said first symbol signal outputted from said first synchronous detector in response to said timing pulse supplied from said timing control circuit, and outputting said first symbol signal as latched with a delay time indicated by said first delay time indicating signal outputted from said timing control circuit;

a second timing adjusting buffer for latching said second symbol signal outputted from said second synchronous detector in response to said timing pulse supplied from said timing control circuit, and outputting said second symbol signal as latched with a delay time indicated by said second delay time indicating signal outputted from said timing control circuit; and a RAKE combining circuit for synthesizing output signals from said first timing adjusting buffer and said second timing adjusting buffer, wherein said timing pulse has the same period as the symbol period, and said first and second delay time indicating signals indicate delay times for said first and second timing adjusting buffers on a symbol period basis, respectively.

4. A spread-spectrum receiver according to claim 3, wherein said first timing adjusting buffer includes:

plural stages of first latch circuits disposed between said first synchronous detector and said RAKE combining circuit; and a plurality of first switches disposed between output terminals of said plural stages of first latch circuits and said RAKE combining circuit, respectively, and turned on/off under the control of said first delay time indicating signal, and said second timing adjusting buffer includes:

plural stages of second latch circuits disposed between said second synchronous detector and said RAKE combining circuit; and a plurality of second switches disposed between output terminals of said plural stages of second latch circuits and said RAKE combining circuit, respectively, and turned on/off under the control of said second delay time indicating signal.

5. A spread-spectrum receiver according to claim 3, wherein said timing control circuit generates said first and second delay time indicating signals on the basis of the delay profile obtained by using a long code longer than one symbol period.

* * * * *